Oct. 29, 1929.  F. A. SMITH  1,733,318
TIRE CARRIER
Filed Feb. 9, 1927  2 Sheets-Sheet 1

INVENTOR.
F. A. Smith
BY Bacon & Thomas
ATTORNEYS

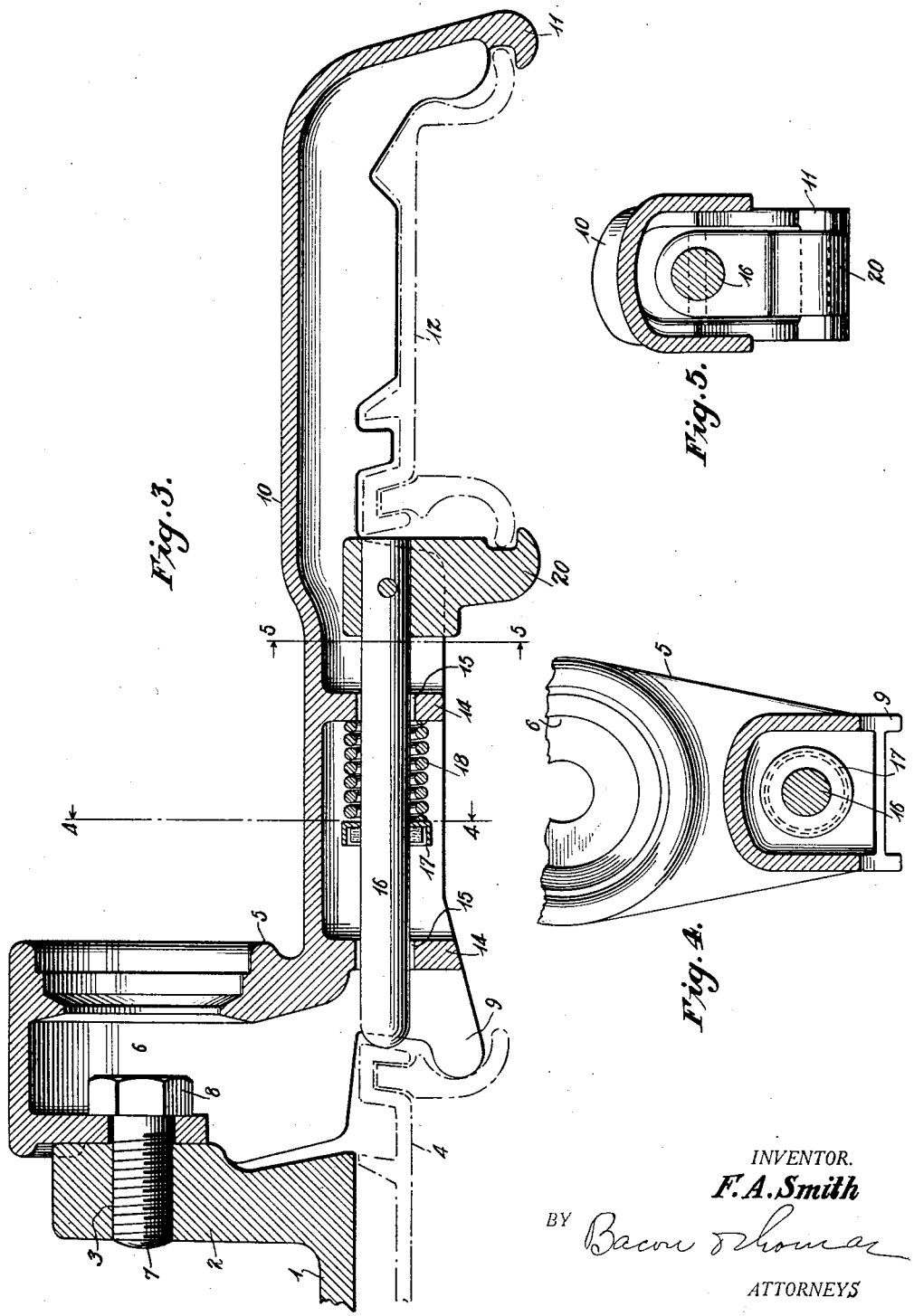

Patented Oct. 29, 1929

1,733,318

UNITED STATES PATENT OFFICE

FREDRICK ARTHUR SMITH, OF INDIANAPOLIS, INDIANA, ASSIGNOR, BY MESNE ASSIGNMENTS, TO DETROIT AND SECURITY TRUST COMPANY, A CORPORATION OF MICHIGAN

TIRE CARRIER

Application filed February 9, 1927. Serial No. 166,913.

The invention relates to improvements in tire carriers.

It is an object of the invention to provide an improved device for locking a pair of spare tires to a carrier.

More specifically, the invention embodies improvements in a locking device having a housing for engaging and locking a spare tire, with means cooperating with the rim of such tire to positively lock to the housing a second spare tire and rim if two spares are being carried.

My improved lock housing is provided with lock controlled means for preventing its removal from the tire carrier by unauthorized persons, and has a pair of rim clamp engaging portions, one engaging and locking the first positioned rim, while the other engages a second rim, which is positively locked in position by a clamping dog thrown to a locking position upon the application of the housing to the tire carrier.

Figure 1:
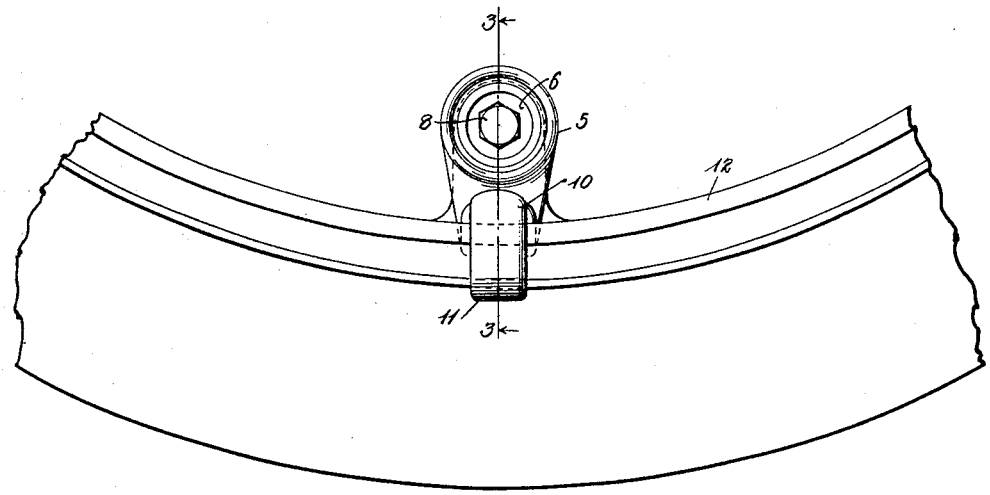
Figure 2:
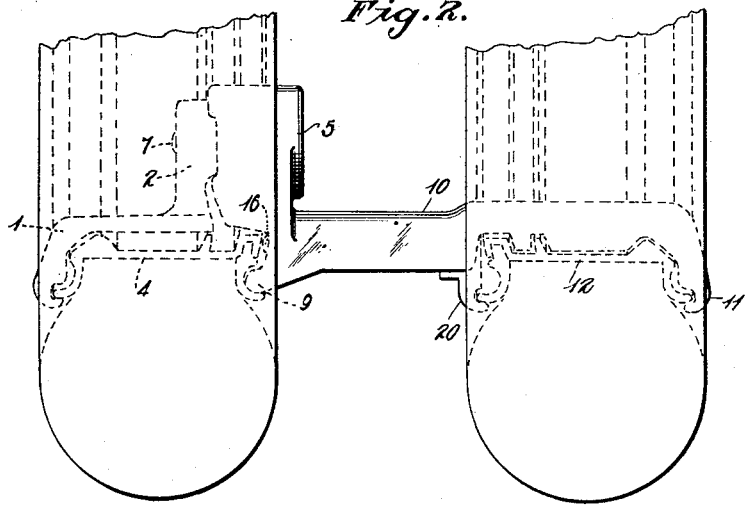

In the accompanying drawings Figure 1 illustrates a view of a tire carrier with the locking assembly applied; and, Fig. 2 is a front view showing the attachment applied to two tires, Fig. 3 is a longitudinal sectional view of the construction, Fig. 4 is a detailed view partly in section, taken on line 4—4 of Fig. 3, and Fig. 5 is a detailed view partly in section taken on line 5—5 of Fig. 3.

Referring now more particularly to the drawings wherein like reference characters indicate corresponding parts, the numeral 1 designates a section of a tire carrier of the ordinary ring type which is mounted to the automobile chassis in the usual manner. This carrier may have an upstanding lug 2 provided with a threaded aperture 3 for receiving a locking bolt or the like to retain the lock housing to be described in position.

A spare rim 4 carrying the usual tire is mounted on the ring 1. This invention relates to an assembly for locking this rim on the ring to prevent unauthorized removal thereof and to also lock on the tire carrier a second spare rim with its tire. The lock housing assembly comprising this invention embodies a housing 5 having a pocket 6 formed therein receiving the bolt 7 having an enlarged head 8. Entrance to this pocket may be gained only by the opening in the outer wall thereof, which opening is normally closed by a lock controlled closure of a type now well known in the art. When this closure is removed an instrument can be inserted in the pocket to engage the head 8 of the bolt 7 by which the housing may be removed or may be locked in place.

This housing carries at its lower end a rim clamp 9 which engages the rim of the tire 4. This obviously locks the rim to the tire carrier. The housing also has preferably an integral extension 10 terminating at its outer end in a rim engaging clamp 11 which is adapted to engage the outer flange of a second rim 12 with its spare tire. This rim and its spare tire are supported upon the hanger by the usual supporting brackets, etc.

The housing carries a pair of vertically disposed downwardly extending walls 14 having aligned apertures 15 therein. A transverse pin 16 passes through said apertures. This pin carries a collar 17 against which a spring 18 impinges the opposite end of the spring engaging the side of the outer wall 14. The spring therefore has a tendency of always moving the pin 16 to the left. At its outer end this pin carries a rim engaging dog 20 fashioned to receive the inner end of a positioned spare rim. The inner end of this pin 16 engages the inner spare rim 4 when the locking assembly is in operative position.

If two spare tires are being carried and it is desired to lock both of said tires to the carrier it is only necessary to place the locking assembly in proper position and to then tighten the bolt 7. As this bolt is tightened the rim clamp 9 engages and locks the inner rim 4 in position. The movement of the assembly toward the rim also acts on the pin 16 forcing this pin rearwardly against the action of the spring 18 so that the clamping dog 20 on the end thereof serves to engage and lock the outer spare rim 12 in position. The movement of the pin 16 forces the outer spare rim 12 against the rim clamp 11, the inner side of this spare rim being, of course, engaged and locked by the clamping dog 20. To remove a spare tire it is only necessary to unscrew the locking bolt 7 which causes the assembly to move away from the rim 4, this, of course, permitting the pin 16 to shift to the right by reason of the action of the spring 18 until the clamping dog 20 has moved to such a position that the outer rim 12 may be removed from the carrier. At this time, of course, the inner rim 4 may also be removed should it be desirable to remove both the spare rims.

Having thus described my invention, what I claim is:

1. A clamping assembly adapted to be applied as an attachment to a primary tire carrier by means of a bolt or the like, said assembly comprising a housing provided with an opening therein adapted to receive a lock controlled closure, means carried by the housing for clamping one side of the primary spare rim, a rim clamp carried by the housing and adapted to engage one side of a supplemental rim to be supported by said carrier, and a clamping element located within said housing and operable when the same is applied to the tire carrier to be horizontally shifted into a position where it engages the other side of the said supplemental spare rim.

2. A tire carrier having means for engaging one edge of a supported primary rim, a housing, said housing having a rim clamp for engaging the adjacent edge of the primary rim, and a second rim clamp engaging the edge of a supplemental rim being supported by said tire carrier, a shiftable rim clamp dog associated with said housing and operable upon application of the housing to the carrier to engage the adjacent edge of the supplemental spare rim.

3. A device of the character described, comprising a housing having an opening therein adapted for receiving, a lock controlled closure for said opening, a bolt for detachably securing the device to a primary carrier, a rim clamp carried by said housing and adapted to engage the primary spare rim supported on said carrier, said housing being provided with a second rim clamp engaging the edge of a supplemental rim supported by the carrier, and a horizontal slidable locking member located within the housing and adapted to engage and lock in position the supplemental spare rim.

4. The combination with a tire carrier provided with a rim clamp for engaging a side of a primary supported rim, of an attachment for said carrier adapted to support a supplemental rim, said attachment being provided with a stationary rim clamp engaging the side of the supplemental supported rim, and a horizontally slidable rim clamp dog, said slidable rim clamp dog being operable to engage the adjacent side of the supplement rim by the action of securing the attachment to the carrier.

5. An assembly adapted to be applied to a tire carrier, said assembly comprising a housing with an opening adapted to receive a lock controlled closure, means carried by the housing for engaging the side of a spare rim to clamp it on the carrier, a rim clamp integral with the housing and adapted to engage the side of a supplemental rim, a movable rim clamping dog carried by the housing and operable to be shifted into engagement with the adjacent side of the supplemental rim when the housing is adjusted with respect to the carrier.

6. A tire carrier for supporting a plurality of rims, said carrier being adapted to receive and support a primary rim, a housing for said carrier provided with a rim clamp for engaging one side of the primary rim to clamp the same in position, said housing having a stationary integral rim clamp adapted to engage the side of a supplemental rim and a movable clamping dog operable to be slid into engagement with the adjacent edge of the supplemental rim when the housing is applied to the carrier.

7. A device for clamping spare rims to a carrier comprising a housing, means carried by the housing for clamping one side of a supported rim into engagement with the tire carrier, said housing having a second rim clamp engaging a supplemental rim at one side thereof, and a shiftable locking dog carried by the housing and operable to be urged into clamping engagement with the adjacent side of the supplemental rim automatically upon application of the housing to the carrier.

8. A spare tire carrier of the ring type adapted to receive and support a tire rim, an attachment for said carrier for supporting a supplemental rim, said attachment comprising a housing adapted to be bolted to the carrier, an opening provided in the housing adapted for receiving the lock controlled closure, said housing having an extension terminating in a rim clamp for engaging the supplemental rim, and a movable spring pressed clamping dog operable to engage the side of the supplemental rim by a movement of the housing relative to the carrier.

9. A tire carrier of the ring type including a supporting portion to receive and support a rim, an attachment for clamping a supplemental rim, said attachment comprising a housing having a clamp engaging one side of the primary rim supported by said ring carrier, the housing having an additional rim clamp engaging one side of the supplemental rim, and a spring pressed slidable rim clamping dog mounted in said housing and having a pin portion engaging the first named rim upon application of the housing to the carrier to thereby shift the dog into a position where it clamps the adjacent side of the supplemental rim.

10. An attachment for clamping a pair of spare rims to a carrier, comprising a housing having two integral rim clamps, one of said rim clamps engaging the primary rim being supported and the other engaging one side of a supplemental rim clamped by the housing, a slidable rim clamp mounted in said housing intermediate said stationary rim clamps and operable to be slid into clamping engagement with the adjacent side of the supplemental rim upon relative movement of the housing with respect to the carrier.

11. An attachment adapted to be applied to a ring type tire carrier to provide means for locking a supplemental rim, said attachment comprising a housing bolted to the ring carrier and an opening adapted for receiving a lock controlled closure to prevent access to the bolt, said housing having a rim clamp engaging the rim supported by said ring, and a rim clamp provided by an extension of the housing for engaging one side of the supplemental rim to be locked, and a movable locking dog enclosed within said housing and adapted to be slid into engagement with the adjacent side of the supplemental rim by adjustment of the housing with respect to the carrier, said locking dog being non-rotatably disposed within the housing.

12. The combination with a tire carrier for receiving and supporting a primary rim, of a device attachable to the said carrier for supporting a supplemental rim thereto, said device having a shiftable member engaging the side of the primary rim when the device is adjusted with respect to the carrier, for causing the shiftable member to be moved horizontally into engagement with the supplemental rim.

13. An attachment for a spare tire carrier for mounting a supplemental rim thereto, said attachment including a stationary rim clamp for engaging the outer edge of the supplemental rim, and a spring pressed shiftable member having a rim clamp dog, bolt means for attaching the device to the carrier, said shiftable member and the rim clamp dog carried thereby being automatically slid in a horizontal direction into engagement with the adjacent edge of the supplemental rim upon attachment of the device to the carrier.

14. An attachment for a spare tire carrier, said attachment having a tubular housing portion and having one end terminating in a rim clamp for engagement with the supplemental rim to be carried thereby, a transversely located shiftable pin located within the confines of the housing, a rim clamp dog carried by the shiftable pin, and means for attaching and adjusting the device to the carrier.

In testimony whereof I affix my signature.

F. ARTHUR SMITH.